United States Patent [19]
Numata et al.

[11] 3,743,392
[45] July 3, 1973

[54] SYNCHRONIZATION MEANS FOR MOTION PICTURE PROJECTOR AND TAPE RECORDER

[75] Inventors: Saburo Numata; Takashi Kagechika, both of Ohmiya, Japan

[73] Assignee: Fuji Shashin Koki Kabushiki Kaisha, Saitama-ken, Japan

[22] Filed: Dec. 7, 1971

[21] Appl. No.: 205,621

[30] Foreign Application Priority Data
Dec. 14, 1970 Japan.............................. 45/111586

[52] U.S. Cl. ............................................. 352/17
[51] Int. Cl. .......................................... G03b 31/04
[58] Field of Search .................. 352/12, 15, 16, 17, 352/19, 20

[56] References Cited
UNITED STATES PATENTS

| | | | |
|---|---|---|---|
| 3,266,862 | 8/1966 | Wagoner | 352/12 |
| 3,441,342 | 4/1969 | Ball et al. | 352/17 |

*Primary Examiner*—Samuel S. Matthews
*Assistant Examiner*—Michael L. Gellner
*Attorney*—Fleit, Gripple & Jacobson

[57] ABSTRACT

A motion picture is synchronized with the sound reproduced by a tape recorder. The drive motor of the motion picture projector is controlled by a D.A converter which is provided with a digital input representing the difference in number of pulses between the accumulated number of synchronization pulses generated respectively by the motion picture projector and the tape recorder.

4 Claims, 3 Drawing Figures

3,743,392

SYNCHRONIZATION MEANS FOR MOTION PICTURE PROJECTOR AND TAPE RECORDER

BACKGROUND OF THE INVENTION

This invention relates to means for synchronizing the operations of a motion picture projector and a tape recorder, and more particularly to means for obtaining synchronization between the picture projected by a motion picture projector and the sound reproduced by a tape recorder by means of pulses generated from the motion picture projector and pulses generated from a recording tape.

When sound is reproduced concurrently with the projection of a picture by using a tape recorder, it is necessary to synchronize the sound with the projected motion picture. Without special synchronization means, the feed of a film and the feed of a tape become asynchronous due to variation in the film feeding speed or variation in the tape feeding speed caused by the fluctuation of the power supply voltage, slippage occurring in the tape feeding mechanism or stretching of the tape. Such asynchronism in the projection of the motion picture results also when the power supply voltage to the motion picture camera or the tape recorder fluctuates at the time of simultaneous recording.

In order to obviate such inconvenience, it has been the practice to utilize synchronizing pulse signals at the time of projection which pulse signals are previously recorded on the tape at the time of photographing.

Namely, the conventional practice has been to record the desired sound on the recording tape concurrently with the photographing pulse signals taken from the film feeding mechanism of the motion picture camera, read the pulse signals at the time of projection and compare the same with the pulse signals generated by the film feeding mechanism of the motion picture projector, determine the speed differential between the motion picture projector and the tape recorder and control the rotation of the driving motor of the motion picture projector or the tape recorder, thereby synchronizing the projected picture and the sound generated by the tape recorder.

For such synchronous control by means of pulses, it is essential that the start of the film of the motion picture projector and the start of the tape of the tape recorder be synchronized. Because, if the start of the film and the start of the tape are not synchronous, the pulses generated by the motion picture projector and the pulses generated by the tape recorder which are to be compared with said first pulses do not correspond to each other, and in result the synchronization means performs the synchronizing operation with a certain deviation between the projected picture and the reproduced sound. This may be avoided by lengthening the pulse interval but too a long pulse interval is undesirable because it results in unstable synchronism between the pulses. For obtaining synchronization between the motion picture projector and the tape recorder by means of pulses, therefore, it has been usually necessary to record a start signal on the film or tape in the form of a notch, conductive element or magnetic signal, and start the co-operating tape recorder or motion picture projector in response to said start signal.

SUMMARY OF THE INVENTION

The present invention provides novel synchronization means which overcomes the above-described disadvantages of the prior art.

The principal object of the present invention is to provide synchronization means for a motion picture projector and a tape recorder, by which the operations of the motion picture projector and tape recorder are automatically brought into synchronism even when the start of said motion picture projector and the start of said tape recorder are asynchronous.

Another object of the invention is to provide synchronization means for a motion picture projector and a tape recorder, by which the operations of the motion picture projector and tape recorder are automatically brought into synchronism even when asynchronism occurs between said motion picture projector and said tape recorder during the motion picture projecting operation.

In order to attain these objects, the synchronization means of the invention is so designed that the pulse signals from the motion picture projector and the pulse signals from the tape recorder are cumulatively counted from the start and the counted numbers of the respective pulse signals are compared with each other, and the driving means of the motion picture projector or tape recorder is controlled by the difference between the number of said pulse signals.

DESCRIPTION OF A PREFERRED EMBODIMENT

Figure 1:
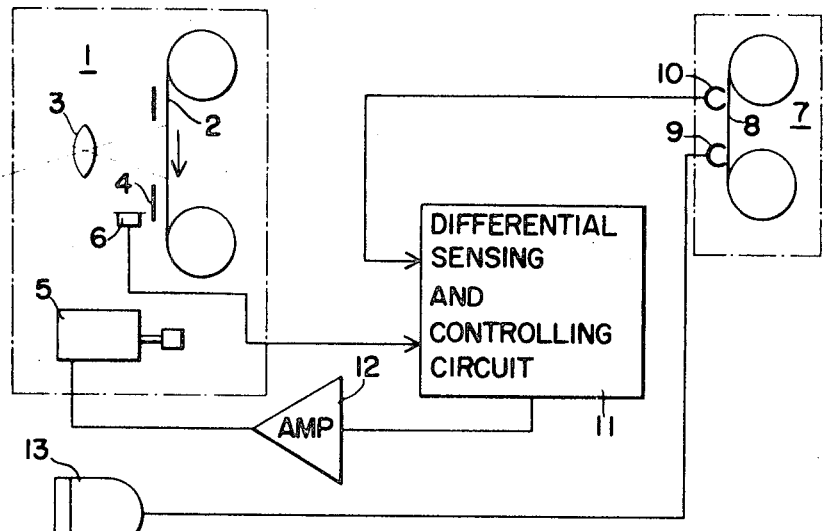
FIG. 1 is a view schematically showing an arrangement comprising the synchronization means of the invention.

Referring to FIG. 1, reference numeral 1 designates a motion picture projector, 2 a film, 3 a projection lens, 4 a shutter and 5 a driving motor, all of which are of the same construction and perform the same function as those in conventional motion picture projectors. Reference numeral 6 designates a pulse generator of any known type which generates synchronizing pulses in co-operation with the shutter 4 and is a switch to intermittently cut off a current or an electromagnetic induction type pulse generating unit. Reference numeral 7 designates a tape recorder, 8 a tape having two or more tracks on which the sound corresponding to the picture taken by a motion picture camera and pulse signals generated from means similar to the pulse generator 6 of the motion picture projector are already recorded, 9 a magnetic head for reproducing the sound, 10 a magnetic head for sensing the pulse signals, 11 a differential sensing and controlling circuit including an addition and subtraction circuit to be described later, 1 an amplifier and 13 a speaker.

Figure 2:
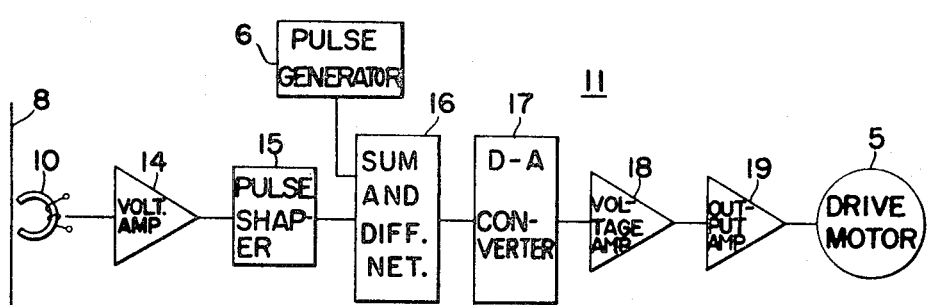
FIG. 2 is a block diagram showing a synchronization control unit of the synchronization means according to the invention.

Referring to FIG. 2, reference numerals 6, 8 and 10 respectively designate the pulse generator, the tape and the pulse sensing head of the motion picture projector mentioned above, 14 a voltage amplifier, 15 a pulse shaper, 16 the addition and subtraction circuit including a Flip-Flop circuit which perfroms addition and subtraction upon counting the pulse signals from the motion picture projector and the pulse signals from the tape, 17 a D-A converter for converting the digital output from the addition and subtraction circuit 16 into an analog output, 18 and 19 a voltage amplifier and an output amplifier respectively, and 5 the driving motor of the motion picture projector mentioned above. The aforesaid controlling circuit 11 is composed of the elements 14 – 19.

Figure 3:
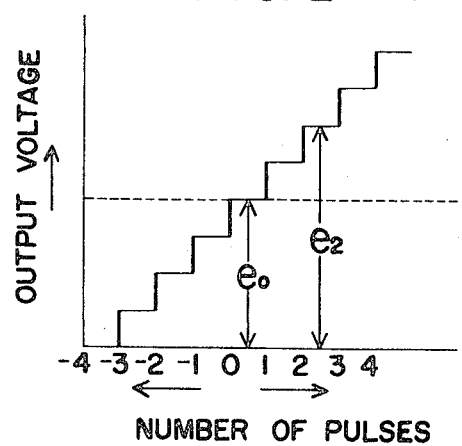
FIG. 3 is a graph showing the relationship between the pulse number difference and the controlling output voltage, for explaining the synchronization control according to the invention.

In the arrangement shown in FIGS. 1 and 2, the film 2 having pictures photographed thereon is mounted on the motion picture projector 1, while the tape 8 having recorded thereon and the sound corresponding to the pictures of the film 2 and the synchronizing signals taken from the motion picture camera (not shown) is mounted on the tape recorder 7, and then said tape recorder 7 is started. The sound recorded in the tape 8 is reproduced by the speaker 13 through the head 9, and at the same time, the start signal is picked up by the head 10. The start signal actuates a relay (not shown) of the motion picture projector 1 through the voltage amplifier 14, and concurrently turns on a projector lamp (not shown) and energizes the driving motor 5 of the motion picture projector 1 through the voltage amplifier. Thus, the projection of the pictures is started. The synchronizing pulses on the tape 8 are supplied to the addition and subtraction circuit 16 through the head 10, the voltage amplifier 14 and the pulse shaper 15 according to the feeding speed of the tape recorder 7, while the pulses from the motion picture projector 1 are concurrently supplied from the pulse generator 6 to the addition and subtraction circuit 16. The addition and subtraction circuit 16 consists of a combination of a Flip-Flop circuit and a special gate circuit so as, for example, to add the pulse signals from the tape 8 and subtract the pulses from the motion picture projector 1. Therefore, when the output of the addition and subtraction circuit 16 representative of the result of addition and subtraction of both pulses is applied to the next D-A converter, the deviation between the motion picture projector 1 and the tape recorder 8 from the start thereof is taken out as an output voltage representative of the pulse number difference as shown in FIG. 3. Namely, the output of the D-A converter is $e_2$ when the feeding of the tape 8 advances ahead of the feeding of the film 2 by, for example, 2 pulses in terms of pulse number. This output $e_2$ is applied to the output amplifier 19 through the voltage amplifier 18 to accelerate the rotation of the driving motor 5 of the motion picture projector 1, whereby the picture catches up with the sound and thus the sound and the picture are synchronized. In this case, more pulses are generated from the motion picture projector 1 as the r.p.m. of the driving motor 5 increases, and when the result of addition and subtraction is 0 in FIG. 3, the output voltage of the D-A converter is $e_0$ which is the output voltage when the tape 8 and the motion picture projector 1 are maintained in synchronism.

In the synchronous start of the motion picture projector 1 and the tape recorder 7 as described above, the operation of the tape recorder 7 tends to run ahead even when the motion picture projector 1 and the tape recorder 7 are started concurrently, because the start of the driving motor of said motion picture projector is always delayed. However, addition and subtraction circuit 16 performs an addition of the pulses generated by the advancing tape recorder 7 and memorizes the added number of pulses, and acts to accelerate the driving motor 5 through the D-A converter, so that the feeding speed of the motion picture projector 1 readily catches up with the feeding speed of the tape recorder 7. Thus, the defect which has been apt to occur with the conventional synchronization means that the feeding speeds of the motion picture projector and the tape recorder are synchronized with a deviation between the picture and the sound, can be completely eliminated. It will be obviously understood that, when the feeding speed of the motion picture projector 1 happens to become faster than that of the tape recorder 7 for any reason during the picture projecting operation, the output voltage of the D-A converter 17 drops below $e_0$ and accordingly the driving motor 5 is decelerated, so that the number of pulses from the motion picture projector 1 becomes smaller than the number of pulses from the tape recorder and the synchronization between the picture and the sound is restored.

Although the present invention has been described with reference to the embodiment in which the rotation of the driving motor 5 of the motion picture projector 1 is controlled in accordance with the operation of the tape recorder 7, it will be understood that it is easily possible to arrange for the synchronization to be obtained between the picture and the sound by controlling the rotation of the driving motor of the tape recorder 7 in accordance with the operation of the motion picture projector 1.

What is claimed is:

1. In a system for creating synchronization between a motion picture and the sound therefor by means of pulses generated from a motion picture projector and a tape recorder, a synchronization means comprising means for taking from the motion picture projector pulses the number of which is proportional to the drive speed thereof, means for taking from the tape recorder, prerecorded pulses recorded on the tape at intervals corresponding to those of said pulses generated by the projector, counting and comparing means for counting the accumulated number of each type of pulse, determining the difference in the number of each type of pulses, and generating an output proportional to said difference in number, and means for controlling the driving means of a projector or tape recorder according to the output of said counting and comparing means so as to make the number of both types of pulses equal.

2. A synchronization means as defined in claim 1 wherein said pulse counting and comparing means comprises an addition and subtraction circuit.

3. A synchronization means as defined in claim 2 wherein said pulse counting and comparing means further comprises a digital to analog converter for converting the digital output of said circuit into an analog input for controlling the driving means of the projector or the tape recorder.

4. A synchronization means for synchronizing a motion picture and its sound track, comprising means for cumulatively counting and comparing the number of pulses generated by a motion picture projector and a tape recorder, means for developing a control signal proportional to the difference between the number of said pulses, and means for controlling the film feeding speed of the motion picture projector according to said control signal, whereby the accumulated number of both types of pulses is controlled to be equal.

* * * * *